Patented Apr. 27, 1948

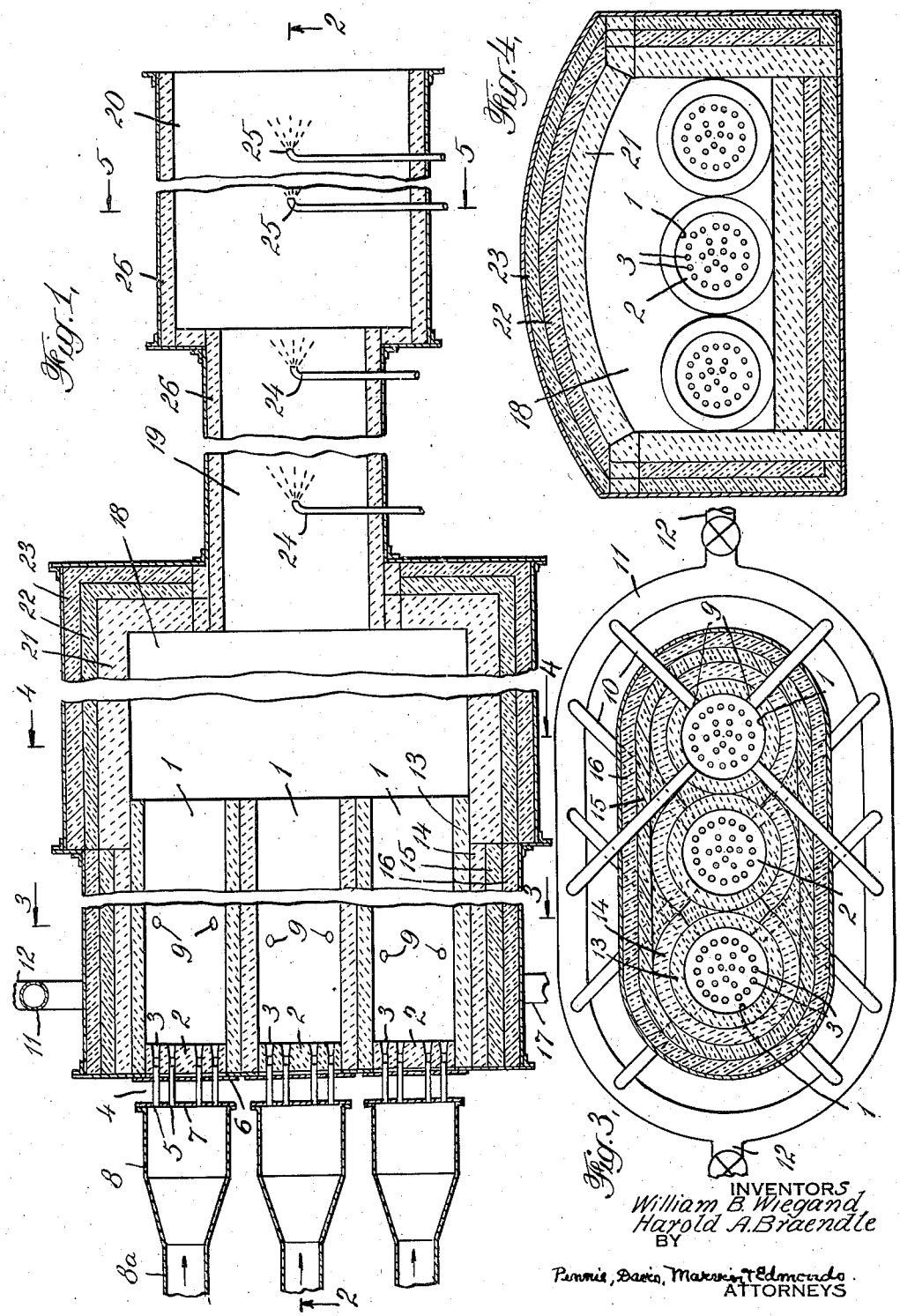

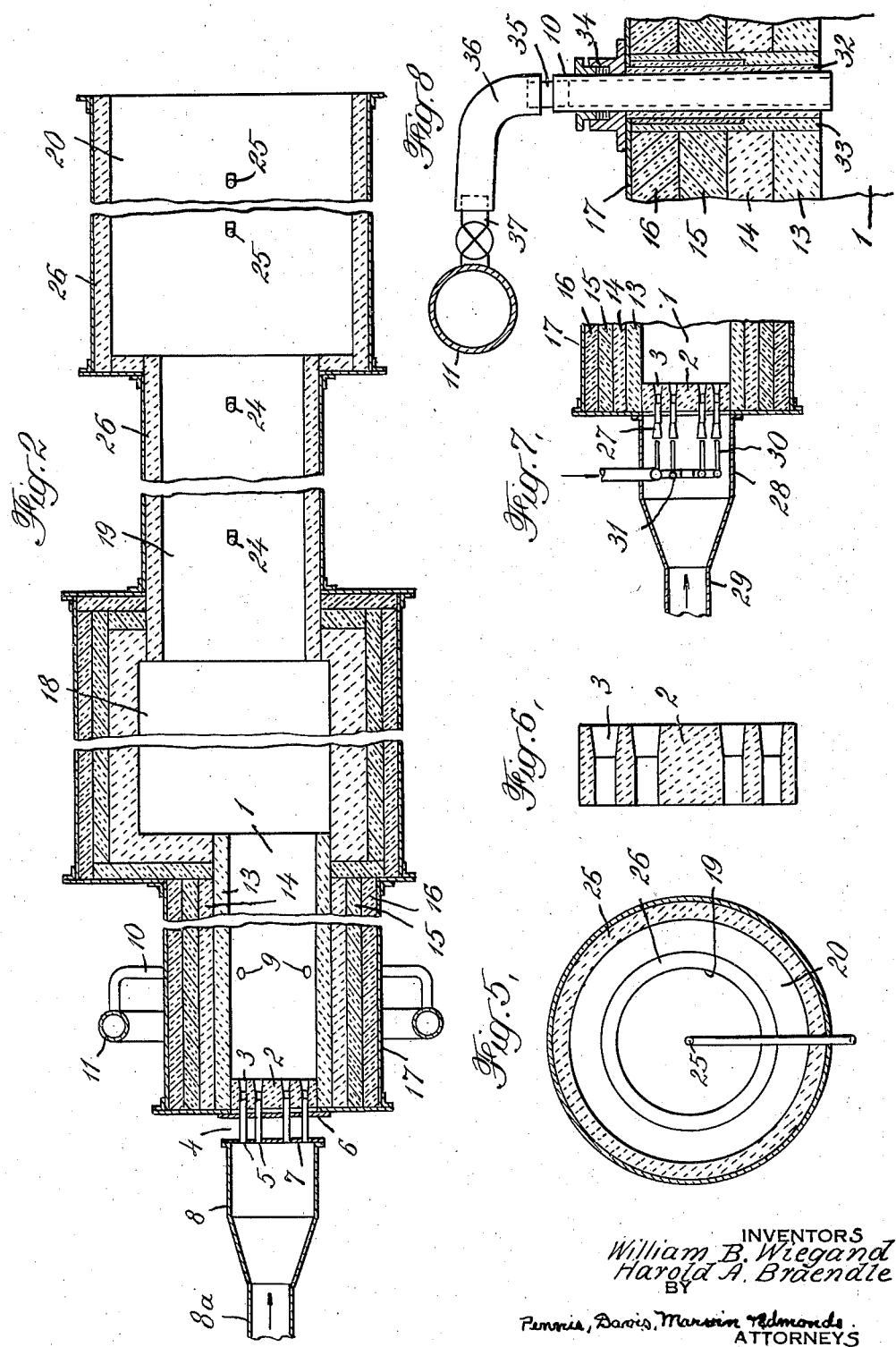

2,440,423

UNITED STATES PATENT OFFICE 2,440,423

APPARATUS FOR MANUFACTURE OF CARBON BLACK

William B. Wiegand, Old Greenwich, Conn., and Harold A. Braendle, Garden City, N. Y., assignors to Columbian Carbon Company, New York, N. Y., a corporation of Delaware Application May 4, 1944, Serial No. 534,089

4 Claims. (Cl. 23—259.5)

This invention relates to the manufacture of carbon black and more particularly to an improved apparatus especially adapted for use in carrying out a novel process for the manufacture of carbon black, described in our copending application Serial No. 534,090, filed May 4, 1944, and in our Patent No. 2,378,055, granted June 12, 1945.

The utility of the apparatus of our present invention is, however, not restricted to the particular operating conditions described in said application. An advantage of the apparatus of our present invention is its flexibility with respect to the range of its operating conditions and the character of carbon black which may be produced therein by varying such conditions.

According to the process described in our said copending application, a hydrocarbon gas, herein referred to as make gas, is injected into an active, turbulent, blast flame, while said flame is being blasted into one end of an unobstructed, elongated reaction chamber, in such a manner as to obtain rapid and thorough mixing of the make gas with the flame gases. The flow of the resultant mixture of flame gases and make gas is continued through the unobstructed reaction chamber at a high velocity and in a state of turbulence, and at a temperature such that, during its passage therethrough, the make gas is decomposed by the heat of combustion to form carbon particles in suspension in the gaseous stream. The stream of gases and suspended carbon is thereafter cooled and the carbon separated and collected by conventional means. Our improved apparatus will be specifically described and illustrated herein with reference to an operation of the type therein described, but, as previously noted, it will be understood that the utility of the apparatus is not so limited.

In general, the apparatus of our present invention comprises an elongated, unobstructed reaction chamber provided at one end with means for burning a combustible gaseous mixture, for instance a mixture of fuel gas and air, under such conditions that the flame is projected into said reaction chamber and the products of combustion continue through said chamber. Ports are provided near the burner end of said chamber for injecting into the chamber and the stream of gases passing therethrough a stream or streams of the make gas, for instance natural gas or an enriched natural gas. The dimensions of the reaction chamber may be varied over a considerable range according to the desired capacity and to meet particular operating conditions. The relative proportions of the chamber and the location of the make gas entry ports are also subject to variation, as hereinafter described.

Our present invention will be described in detail with reference to the accompanying drawings which represent a particularly advantageous embodiment thereof. Fig. 1 is a horizontal sectional view and Fig. 2 is a vertical longitudinal sectional view along the line 2—2. Fig. 3 is a transverse sectional view of the apparatus along line 3—3 looking towards the left. Fig. 4 is a transverse sectional view along the lines 4—4 looking towards the left. Fig. 5 is a transverse sectional view along the lines 5—5. Fig. 6 is an enlarged sectional view of the burner block. Fig. 7 is a sectional view of a modified burner assembly, and Fig. 8 is a fragmentary section of the apparatus showing an arrangement of the make gas entry tubes.

The apparatus specifically illustrated in the drawing comprises three reaction chambers combined in a single unit. However, it will be understood that where desirable entirely separate and independent reaction chambers may be employed. Also, in the particular embodiment of the invention illustrated by the drawings cylindrical reaction chambers are shown. It will be understood, however, that the cylindrical shape, though generally desirable, is not essential. The reaction chamber may, for instance, be of rectangular cross-section.

At the forward end of each reaction chamber 1 there is a burner block 2, advantageously of heat resistant ceramic material, provided with a plurality of flared ports 3. The burner blocks shown are of such dimensions as to slide into the forward end of the reaction chamber and to be secured therein by conventional means. Adjacent each burner block, there is a blast burner head 4 composed of a plurality of tubes 5 supported by and projecting through plates 6 and 7 so that the ends of the tubes 5 nearest the burner block project slightly into the blast ports 3. The forward plate 6 is securely anchored to the end wall of furnace chamber 1 by conventional means. Plate 7 is securely fastened to the housing 8 so as to make a gas-tight fit. The housing 8 is connected by means of a conduit 8a to a suitable source of combustible gas mixture under pressure, for instance natural gas and air.

At a substantial distance down stream from the burner block, each of the chambers is provided with ports 9 through which the make gas is injected into the reaction chamber. As shown, a plurality of such ports is provided and so arranged that one port is positioned diametrically opposite another port.

Make gas tubes 10 are shown extending through the walls of the reaction chamber and terminating at the respective ports 9. The outer ends of the make gas tubes are connected to a manifold or bustle pipe 11 to which the make gas is supplied through conduits 12. Instead of terminating flush with the inner wall of the chamber 1, as shown in the drawing, the make gas tubes may project a greater or lesser distance into the chamber for the purpose of providing means of pre-heating the make gas prior to injection into the blast flame, the extent of such projection depending upon the diameter of the chamber and the amount of pre-heating desired. The make gas tubes are with advantage so positioned as to inject the make gas into the reaction chamber at a substantial angle to the longitudinal axis of the chamber. This arrangement of the make gas entry tubes has been found to provide more uniform and rapid mixing of the make gas with the blast flame gases. In the drawing, the make gas entry tubes are shown positioned at substantially right angles to the longitudinal axis of the chamber, and this position of the make gas tubes has been found to be particularly advantageous. However, this position of the make gas tubes may be varied considerably so long as they form a substantial angle with the axis of the chamber, say not less than about 30°.

The diameter of the make gas entry tubes may be varied somewhat depending upon the capacity of the particular apparatus and the number of make gas tubes employed for each reaction chamber. Make gas tubes ranging from $\frac{1}{16}$ inch to 4 inches, inside diameter, have been used with advantage but dimensions toward the upper and lower ends of this range have been found less desirable. Make gas tubes of about 1 inch in diameter have been found particularly satisfactory.

The capacity of the bustle pipe 11 and the conduits 12 leading thereto should be such that a uniform pressure is readily maintained throughout the bustle pipes so as to avoid unequal flow of gas through the respective make gas tubes. The equalization of gas pressure in apparatus such as shown is facilitated by providing a plurality of gas inlets to the bustle pipe, though this may not be necessary in all instances.

The reaction chambers 1 are lined with a 4½ inch thickness of fire brick 13 or other refractory material and should be insulated against heat loss. In the apparatus shown in the drawing, the fire brick lining of each of the chambers is surrounded by a 4½ inch layer 14 of highly refractory material and the entire assembly is surrounded by two layers of heat-insulating material 15 and 16, each 4½ inches thick, all encased in a sheet metal steel shell 17.

At their ends opposite the burner blocks, the several reaction chambers open into an enlarged blending chamber 18. Where a single reaction chamber is used, the blending chamber may be omitted and the reaction chamber elongated to provide the necessary time factor.

The dimensions of the reaction chamber may be varied over a considerable range as previously indicated. Where a cylindrical reaction chamber is used, the diameter may with advantage be varied from about 6 to 9 inches up to about 2 feet, depending upon the desired capacity. The dimensions may correspondingly vary where a rectangular reaction chamber is used. However, we have found that where cylindrical reaction chambers are employed having a diameter in excess of about 2 feet, difficulty is experienced in obtaining adequate and uniform mixing of the make gas with the blast flame. Also, where rectangular reaction chambers are used, it is desirable that at least one transverse dimension of the chamber does not exceed about 2 feet.

The length of the reaction chamber will be governed primarily by the velocity at which the gases are to be passed therethrough and should be sufficient to provide the necessary time factor. We have found generally that the reaction chamber should extend at least about 5 feet, preferably about 7 feet, beyond the zone of make gas entry, which in turn should be down stream from the forward end of the chamber, a distance equivalent to about 1 to 3 diameters or 1 to 3 times the smaller transverse dimensions of the reaction chamber. In apparatus such as shown in the drawing, reaction chambers of about 10 feet in length have been used with advantage. Particularly where enlarged blending chambers, such as chamber 18, are not employed, the length of the reaction chamber may with advantage be as great as about 20 feet.

The gaseous mixture with carbon particles suspended therein passes from the blending chamber 18 through an elongated cylindrical flame 19 to the pre-cooler 20 and from thence passes to conventional cooling and carbon collecting equipment not shown in the drawing.

In the operation described in our previously mentioned co-pending application, it is necessary to maintain the gas stream in a high state of turbulence during the formation of carbon particles. A confined zone of relatively small cross-sectional area has been found conducive to this condition. It is further desirable that a high temperature be maintained for a more extended period, but it is not necessary to maintain the same high degree of turbulence over the entire period. The primary purpose of the blending chamber is to provide such extended period of time during which the mixture is maintained at reaction temperatures.

Under such conditions, we have found it advantageous, particularly with respect to economy of construction and space, to provide the necessary time factor by enlarging the cross-sectional area of the chamber through which the reaction products are passed following the necessary period of high turbulence. This expedient is applicable to a unit comprising either a single reaction chamber or a multiplicity of reaction chambers as shown in the drawing.

The enlargement in cross-sectional area should not be so great as to permit the establishment of large eddies within the chamber which might cause a retention of a portion of the carbon in the chamber for a period of time so prolonged as to detrimentally affect the products. Optimum transverse dimensions are dependent upon the rate at which the gaseous mixture is to be supplied to the zone, and the length will depend upon the period of time required for the completion of the reaction, of which the velocity of the gases passing through the zone is an important factor.

In the apparatus illustrated in the drawings, satisfactory results have been obtained where the blending chamber 18 was 8¼ feet wide, 12¾ feet long and averaged about 4 feet in height, each of the reaction chambers leading thereto being 2 feet in diameter and 10 feet long. These dimensions will vary with capacity and other operating conditions.

In order to provide adequate velocity for the required turbulence in the confined zone, herein designated reaction chamber and, at the same time, provide the required reaction time at high temperature, it has been found desirable to maintain the ratio of total volume of reaction zone and blending chamber in cubic feet, to cross sectional area of the reaction chamber or chambers, expressed as square feet, in the range of 20 to 80 cu. ft. per sq. ft. Thus a ratio of about 55:1 has been used in apparatus such as shown in the drawing. Particularly desirable results are obtained in commercial units in which this ratio is within the range of 35:1 to 70:1.

The blending chamber 18 is lined with a 9-inch layer of fire brick 21 surrounded by two layers of heat insulating material 22 and 23, each 4½ inches thick.

In passing through the flume 19, the gaseous mixture and suspended carbon particles are gradually cooled, and this cooling may be facilitated by conventional water spray. For this purpose we have provided water spray nozzles spaced along the flume as indicated in the drawings at 24. One or more of these water sprays may be used consecutively and, by selection of the point along the path of the gas at which the water spray is introduced, the time factor of the reaction may be controlled. In the pre-cooler 20, we have provided further water sprays 25 spaced along the path of the gases therethrough. The cross-sectional area of the precooler 20 is with advantage greater than that of the flume 19 so to permit a reduced velocity of the gaseous and carbon particle mixture. In the apparatus shown, the inside diameter of the flume 19 is 3½ feet and that of the pre-cooler is 5¾ feet.

The flume 19 and the pre-cooler 20 are with advantage constructed of refractory material 26 and are with advantage uninsulated so as to permit the dissipation of heat and gradual cooling of the gaseous mixture.

The reduced cross-sectional area of the flume has several advantages. Because of its greater ratio of surface area to volume, the gradual cooling of the mixture passing therethrough is expedited. Further, a more accurate control of the time factor of the operation may be obtained.

Where reaction chambers of relatively small cross-sectional area are used, a single blast jet may be employed instead of the multiple jet burner block shown in the drawings. However, in larger units having cross-sectional diameters approximating 9 inches or over, a plurality of jets should be employed in order to supply a sufficient volume of blast flame of the desired velocity and turbulence and to further a uniform flame development across the transverse section of the chamber.

The throat of the blast nozzle or nozzles should not exceed about 2 inches to 2½ inches in diameter. Diameters greater than 2½ inches have generally been found undesirable. The total area of the burner ports should be such as to deliver an adequate volume of the combustible mixture to the reaction chamber at the desired velocity, advantageously such as to provide a highly turbulent blast flame. The velocity should be such that the flame cannot strike back into the supply line, where pre-mixed air and gas are used. Burner heads adapted to deliver the combustible mixture to the reaction chamber at a blast gas nozzle velocity in the range of 35–135 ft. per second, based on volume of fuel gas and air measured at 60° F. and an absolute pressure of 30 inches of mercury, have been found desirable. Burners adapted to nozzle velocity of about 85 feet per second have been found particularly effective.

Satisfactory operation has been obtained in units having a total burner port throat area of 3% to 28% of the free cross-sectional area of the reaction chamber. In larger units areas of 7% to 25% are usually employed with advantage. Areas of around 12½% have been found especially advantageous with nozzle mixing burners, and areas of about 7 to 10% have been found particularly advantageous with pre-mixing burners.

Various types of blast burners adapted to such high velocity operation may be used in place of the burner specifically illustrated in the drawing. However, we have found it desirable to use burner blocks so designed as to create a zone of eddy currents at the periphery of each blast nozzle exit, as such condition appears to assist in maintaining ignition of the blast flame at the nozzle exit and to permit maximum jet velocity and to assist in maintaining a maximum rate of combustion and uniform flame development across the transverse section of the furnace. Burner blocks, such as shown, having a substantial area of relatively flat surface at the burner block face surrounding the ports appear to assist in creating and maintaining such zone of eddy currents.

Instead of supplying pre-mixed air and gas to the system, the air and gas may be separately supplied, for instance, as shown in Figure 7 of the drawings, which represents an assembly of a burner block 2 shown in greater detail in Figure 6 of the drawing, with flared metal tubes 27 cemented into the outer end of the ports 3, and enclosed within the wind-box 28 to which the air is supplied through the duct 29 unmixed with fuel gas. With this arrangement, the fuel gas is jetted into the air streams passing into the tubes 27 by fuel jets 30 to which the fuel gas is supplied under pressure through a suitable manifold 31.

An important aspect of our present invention is the means provided for injecting the make gas into the blast flame passing through the combustion zone of the reaction chamber. As shown in greater detail in Figure 8 of the drawing, heat-conducting, refractory make gas tubes 10, in accordance with this modification of the apparatus, pass through sleeves 32, also of refractory material, such as silicon carbide ("Carbofrax" for instance), said sleeves extending through the walls of the reaction chamber and terminating at the inner surface of the chamber wall. These sleeves are sealed in place by refractory cement 33.

The inner diameter of the sleeve 32 is sufficiently greater than the outer diameter of the make gas tube 10 to permit lateral movement of the make gas tube through the sleeve, so that the inner end of the make gas tube may be adjusted with respect to the inner wall of the reaction chamber. The fit between the sleeve and the make gas tube is made gas-tight by means of packing gland 34. The refractory make gas tube extends outwardly beyond the packing gland and a metal nipple 35 is cemented into the end thereof. Fitted on to the outer end of the nipple is a flexible tube 36 connecting the nipple 35 with a valved nipple 37 leading from the manifold or bustle pipe 11.

In passing through the refractory make gas tube the make gas may be substantially preheated before coming in contact with the blast flame and the amount of pre-heating may be increased by adjustment of the tube so that it will project a greater distance into the reaction chamber. The amount of pre-heating will also depend to a substantial extent upon the velocity of the make gas through the tube and the ratio of surface area to cross-sectional area of the tube.

In the apparatus shown in the drawing, four make gas tubes are provided for each reaction chamber. A greater or lesser number may be used; however, it is desirable to use at least two make gas tubes and that for each tube there be a diametrically opposite tube, as it has been found that with this arrangement more rapid and uniform mixing of the make gas with the flame gases is obtained and that there is less tendency for the jet of make gases to come into contact with the hot refractory walls of the reaction chamber prior to adequate mixing of the make gas with the flame gases. For a reaction chamber 2 feet in diameter, such as shown in the drawings, six 1" inside diameter tubes mounted in 2" inside diameter sleeves have been found particularly advantageous.

As shown in the drawings, each of the make gas tubes for any one reaction chamber enters the chamber at an equal distance from the burner block. It is frequently desirable to provide a plurality of sets of make gas tubes, the tubes of the respective sets entering the chamber at different distances from the burner block. Two, three or more sets of tubes of two or more tubes each may with advantage be provided and have been found to facilitate adjustment of the position of make gas entry relative to the optimum zone of the blast flame.

The present application is in part a continuation of our co-pending application Serial No. 448,806 filed June 27, 1942, which in turn is in part a continuation of application Serial No. 349,908, filed August 2, 1940, now abandoned.

We claim:

1. Apparatus for the production of carbon black comprising a plurality of elongated, unobstructed heat-insulated reaction chambers of substantially uniform transverse area, each provided with a blast burner positioned in one end thereof and comprising a burner block substantially coextensive with the transverse area of the chamber, said burner block comprising a plurality of burner ports arranged in a uniform pattern over the entire face of the burner block, the blast burner being so constructed and arranged as to project into said chamber a plurality of blast flames in a direction generally parallel to the longitudinal axis of said chamber, connections adapted to convey air and fuel gas under pressure to the burner, a plurality of tubes leading into each chamber and terminating in a zone thereof toward its burner end, the inner ends of the respective tubes being spaced a substantial distance from the burner block and being directed across the chamber substantially transversely of the longitudinal axis thereof and toward an opposite wall thereof, connections adapted to supply a gaseous medium under pressure to said tubes, a heat-insulated blending chamber of enlarged cross-sectional area communicating with the end of each reaction chamber opposite the burner, an elongated substantially uninsulated chamber of reduced cross-sectional area leading from said blending chamber and liquid spray nozzles longitudinally spaced along the last mentioned chamber.

2. Apparatus for the production of carbon black comprising a plurality of elongated, unobstructed heat-insulated reaction chambers of substantially uniform transverse area, each provided with a blast burner positioned in one end thereof, said burner comprising a burner block, substantially coextensive with the transverse area of the chamber and provided with a plurality of burner ports arranged in a uniform pattern over the entire face of the burner block, the total transverse area of the burner ports being 3 to 28% of the cross-sectional area of the chamber, the blast burners being so constructed and arranged as to project into the respective chambers a plurality of blast flames in a direction generally parallel to the longitudinal axis of the chamber, connections adapted to convey air and fuel gas under pressure to the burners, a plurality of tubes leading into each chamber and terminating in a zone thereof toward its burner end, the inner ends of the respective tubes being spaced a substantial distance from the burner block, being substantially unrestricted and being directed across the chamber substantially transversely of the longitudinal axis thereof and toward an opposite wall thereof, connections adapted to supply a gaseous medium under pressure to said tubes, a heat-insulated blending chamber of enlarged cross-sectional area communicating with the end of each reaction chamber opposite the burner, the ratio of the total chamber volume, including the blending chamber, in cubic feet to total cross-sectional area of the reaction chambers in square feet being within the range of 20 to 80 cubic feet per square foot.

3. Apparatus for the production of carbon black comprising a plurality of elongated, unobstructed heat-insulated reaction chambers of substantially uniform transverse area, each provided with a blast burner positioned in one end thereof, the blast burner being so constructed and arranged as to project into said chamber a blast flame in a direction generally parallel to the longitudinal axis of said chamber, connections adapted to convey air and fuel gas under pressure to the burner, a plurality of tubes leading into each chamber and terminating in a zone thereof toward its burner end, the inner ends of the respective tubes being spaced a substantial distance from the burner block and being directed across the chamber substantially transversely of the longitudinal axis thereof and toward an opposite wall thereof, connections adapted to supply a gaseous medium under pressure to said tubes, a heat-insulated blending chamber of enlarged cross-sectional area communicating with the end of each reaction chamber opposite the burner, an elongated substantially uninsulated chamber of reduced cross-sectional area leading from said blending chamber and liquid spray nozzles longitudinally spaced along the last mentioned chamber.

4. Apparatus for the production of carbon black comprising a plurality of elongated, unobstructed heat-insulated reaction chambers of substantially uniform transverse area, each provided with a blast burner positioned in one end thereof, the blast burners being so constructed and arranged as to project into the respective chambers a blast flame in a direction generally parallel to the longitudinal axis of the chamber, connections adapted to convey air and fuel gas under pressure to the burners, a plurality of tubes leading into each chamber and terminating in a zone thereof toward its burner end, the inner ends of the respective tubes being spaced a substantial distance from the burner block, being substantially unrestricted and being directed across the chamber substantially transversely of the longitudinal axis thereof and toward an opposite wall thereof, connections adapted to supply a gaseous medium under pressure to said tubes, a heat-insulated blending chamber of enlarged cross-sectional area communicating with the end of each reaction chamber opposite the burner, the ratio of the total chamber volume, including the blending chamber, in cubic feet to total cross-sectional area of the reaction chambers in square feet being within the range of 20 to 80 cubic feet per square foot.

WILLIAM B. WIEGAND.
HAROLD A. BRAENDLE.

REFERENCES CITED

The following references are of record in the file of this patent:

UNITED STATES PATENTS

| Number | Name | Date |
|---|---|---|
| 166,036 | Spencer | July 27, 1875 |
| 1,804,249 | Day | May 5, 1931 |
| 1,847,242 | Guyer | Mar. 1, 1932 |
| 1,892,534 | Rembert | Dec. 27, 1932 |
| 1,981,150 | Pyzel | Nov. 20, 1934 |
| 2,129,269 | Furlong | Sept. 6, 1938 |
| 2,140,316 | Furlong | Dec. 13, 1938 |
| 2,144,971 | Heller | Jan. 24, 1939 |
| 2,375,795 | Krejci | May 15, 1945 |
| 2,375,796 | Krejci | May 15, 1945 |
| 2,375,797 | Krejci | May 15, 1945 |
| 2,375,798 | Krejci | May 15, 1945 |